United States Patent [19]
Fassina et al.

[11] Patent Number: 5,457,159
[45] Date of Patent: Oct. 10, 1995

[54] PROCESS FOR THE PREPARATION OF PLASTOELASTOMERIC COMPOSITIONS BASED ON A THERMOPLASTIC OLEFINIC POLYMER WITH AN ALKYLPHENOL-FORMALDEHYDIC RESIN AND SODIUM BISULPHITE

[75] Inventors: Roberto Fassina; Alessandro Fassina, both of Pavia, Italy

[73] Assignee: Paranova Articoli Tecnici S.r.l., Pavia, Italy

[21] Appl. No.: 163,536

[22] Filed: Dec. 9, 1993

[30] Foreign Application Priority Data

Dec. 17, 1992 [IT] Italy .................. MI92A2875

[51] Int. Cl.$^6$ .................. C08L 61/10; C08L 23/16
[52] U.S. Cl. .................. 525/133; 525/134; 525/139; 525/141; 525/145; 525/232; 525/236; 525/237; 525/240; 525/480; 525/502; 525/505; 524/418; 524/419; 524/421
[58] Field of Search .................. 525/133, 134, 525/139, 141, 145, 232, 236, 237, 240, 480, 502, 505; 524/418, 419, 421

[56] References Cited

U.S. PATENT DOCUMENTS

| | | | |
|---|---|---|---|
| 1,996,069 | 4/1935 | Hönel | 260/4 |
| 4,364,192 | 12/1944 | Charlton et al. | 260/53 |
| 4,311,628 | 1/1982 | Abdou-Sabet et al. | 260/33.6 AQ |
| 4,707,519 | 11/1977 | Forti et al. | 525/133 |
| 5,011,891 | 4/1991 | Spenadel et al. | 525/211 |
| 5,182,346 | 1/1993 | Gerber | 525/503 |

*Primary Examiner*—W. Robinson Clark
*Attorney, Agent, or Firm*—Oblon, Spivak, McClelland, Maier & Neustadt

[57] ABSTRACT

Process for the preparation of plastoelastomeric preparations comprising an elastomeric phase of an EPDM elastomer and a plastomeric phase of a thermoplastic olefinic polymer, wherein the elastomeric phase is dynamically vulcanized with a vulcanizing binary agent consisting of an alkylphenol-formaldehydic resin and sodium bisulphite.

15 Claims, No Drawings

A PROCESS FOR THE PREPARATION OF PLASTOELASTOMERIC COMPOSITIONS BASED ON A THERMOPLASTIC OLEFINIC POLYMER WITH AN ALKYLPHENOL-FORMALDEHYDIC RESIN AND SODIUM BISULPHITE

FIELD OF THE INVENTION

This invention relates to a process for the preparation of plastoelastomeric compositions based on a thermoplastic olefinic polymer, comprising an elastomeric phase of a thermoplastic olefinic polymer, wherein said elastomeric phase is dynamically vulcanized.

Specifically, this invention relates to a process for the preparation of plastoelastomeric compositions.

The invention also relates to plastoelastomeric compositions obtainable with said process as well as to the artifacts obtained from them.

BACKGROUND OF THE INVENTION

The process of dynamic vulcanization is well known in the art and described, for instance, in Italian Patent Nr. 948902.

This patent describes the preparation of plastoelastomeric compositions whose elastomeric phase is dynamically vulcanized by means of organic peroxides.

Other systems of dynamic vulcanization of the elastomeric phase of plastoelastomeric compositions are described in U.S. Pat. Nos. 3,997,487, 4,247,652, 4,409,365 and 4,835,204.

However, the plastoelastomeric obtained by the known vulcanization systems have physical-mechanical and processeability properties that are not entirely satisfactory, which cause the compositions to be unsuitable for all the applications for which they should be utilized.

Object of this invention is to solve this drawback of the known vulcanization systems.

Specifically, an object of this invention is to provide a vulcanization system such as to permit the preparation of dynamically vulcanized plastosoluble compositions having improved physical-mechanical and processeability properties.

SUMMARY OF THE INVENTION

According to this invention, these and still other objects are achieved by using a binary vulcanization system comprising an alkylphenol-formaldehydic resin and sodium bisulphite.

The object of this invention is therefore a process for the preparation of plastoelastomeric compositions formed by a plastomeric phase consisting of a thermoplastic olefinic polymer and a dynamically vulcanized elastomeric phase wherein dynamic vulcanization has been obtained by using a binary vulcanizing system consisting of an alkylphenol-formaldehydic resin and sodium bisulphite.

DESCRIPTION OF THE PREFERRED EMBODIMENTS

The plastoelastomeric compositions of this invention are obtained by submitting to mastication a mix of an elastomer (elastomeric phase) and a polyolefin (plastomeric phase), in a desired weight ratio, at temperatures high enough to permit the fusion of the plastomeric phase, for instance from 150° to 190° C., according to the type of polyolefinic elastomer, and for a time long enough to obtain an homogeneous mixing of the two components. For this purpose, one can use the common apparatuses and technologies known and utilized in the preparation of thermoplastic blends based on elastomers and plastomers, such as, for instance, Banbury-type internal mixers, Buss-type continuous masticators/extruders, two-screw corotating or counterrotating masticating drawplates, two-roller calenders, or the like.

To the homogeneous mass so obtained, still moving and brought to a temperature between 160° and 230° C., preferably between 180° and 210° C. the two chemical compositions are added which comprise the vulcanization system and the mass is kept moving until the desired degree of vulcanization of the elastomer is reached, which preferably should not exceed 95% by weight. The binary vulcanization system, consisting of a mixture of an alkylphenol-formaldehyde and sodium bisulphite is added in an amount between 2 and 20, preferably between 3 and 15, weight parts per 100 weight parts of the elastomer.

In the binary vulcanization system, sodium bisulphite varies from 50 and 150, preferably from 60 to 130, weight parts per 100 weight parts of the alkylphenol-formaldehydic resin; as a consequence, the weight ratio between sodium bisulphite and alkylphenol-formaldehydic resin is between 5:10 and 150:100.

The time necessary for the vulcanization varies according to the temperature variation and is generally between 30 seconds and 30 minutes.

By way of example and orientation, some times of vulcanization in function of temperature are given hereunder:

at 160° C.: 10–30 minutes,
at 170° C.: 5–10 minutes,
at 180° C.: 1–5 minutes,
at 190° C.: 60 seconds–2 minutes,
at 200° C.: 30–60 seconds.

Having completed the vulcanization, the plastoelastomeric composition so obtained is cooled and transformed by extrusion into a physical form (generally granules or pellets) suitable for an easy utilization with the techniques usually utilized for thermoplastic materials, such as, for instance, drawing, moulding, calendering, etc.

The plastoelastomeric compositions so obtained have improved processeability and elasticity properties, and, in general, improved-physical mechanical characteristics compared to the known plastoelastometic compositions.

ELASTOMERIC PHASE

The elastomers utilized as elastomeric phase in the compositions of this invention are the EPDM ones known for their excellent vulcanizing properties, such as resistance to ozone, protracted heat, oxygen, UV radiation, basic and acid chemical agents.

EPDM elastomers are structurally amorphous polymers constituted by ethylene, by at least another alpha-olefin having a higher number of carbon atoms, for instance fom 2 to 6, such as propylene or butylene-1, and by at least a dienic monomer, which has preferably the non-conjugated configuration. For this reason, EPDM elastomers are defined as saturated polymeric chain polymers, having therefore high chemical inertia.

Examples of dienic monomers include:

1,4-hexadiene, 1,5-hexadiene, 1,5-cyclooctadiene, 2-methyl-1,4-pentadiene, dicyclopentadiene, ethylidine-norbonene, butadiene or associated mixtures, and preferably 1,4- hexadiene, dicyclopentadiene, ethylidine-norbonene or associated mixtures. Preferred EPDM elastomers are those obtained by polymerization of monomers by metallorganic catalysis and vanadium soluble salts and have a molecular weight between 100,000 and 700,000, an ethylene contents between 20 and 80% in moles, a bound dienic monomer content between 3 and 18% in weight per 100 parts in weight of polymer, the rest being propylene.

PLASTOMERIC PHASE

Thermoplastic olefinic polymers which form the plastomeric phase of plastoelastomeric compositions of this invention are homopolymers or copolymers having a high molecular weight (between 100 and 100,000) obtained by the polymerization of $C_2$–$C_8$ alpha-olefins, such as ethylene, propylene, butene-1, pentene-1, 1-methylpentene-1, 2-methylpentene-1, 3-methylpentene-1, 4-methylpentene-1, hexene-1, 1-methylhexene-1, 2-methylhexene-1, 3-methylhexene-1, 4-methylhexene-1, 5-methylhexene-1, heptene-1.

Preferably one or more olefinic polymers of the above mentioned type, and preferably polyethylene, of either the high-density or the low-density or the linear type, and/or isotactic or syndiotactic cristalline polypropylene and/or propylene-ethylene copolymers, are preferably used for the purposes of this invention.

ELASTOMER/PLASTOMER MIXES

According to this invention, the EPDM elastomer/polyolefinic plastomer mixes comprise weight ratios that vary according to the final use of the compositions and they may vary from 10 to 90% by weight of elastomer and from 90 to 10% by weight of plastomer; preferably from 60 to 85% by weight of elastomer and from 40 to 15% by weight of plastomer.

VULCANIZATION SYSTEM

The vulcanization system of this invention is an alkylphenol-formaldehydic resin utilized with sodium bisulphite. As yet, this binary system has neither been utilized for the vulcanization of dienic rubber in general nor for EPDM rubber in particular. Surprisingly, applicants have now discovered that its utilization in the dynamic vulcanization of EPDM elastomeric phase of plastoelastomeric compositions lends the final compositions better characteristics of processeability, elasticity and generally better physical-mechanical properties compared to those obtained by analogous compositions which carry out dynamic vulcanization by means of other known vulcanization systems (vulcanization agents and coagents). Alkylphenol-formaldehydic resins are known as vulcanization agents of low dienic content-rubbers, such as, for instance, butylic rubber (generally referred to as I I R, i.e. Isoprene-Isobutene Rubbers), but only in combination with donors of halogens or together with metal oxides (see Werner Hofman, "Vulcanization and Vulcanizing Agents", pp. 300–301, MacLaren and Sons Ltd., London), according to reaction schemes widely illustrated in said text.

The alkylphenol-formaldehydic resin utilized together with sodium bisulphite for the dynamic vulcanization of the EPDM elastomeric phase of the plastoelastomeric composition subject matter of this invention has the following general formula:

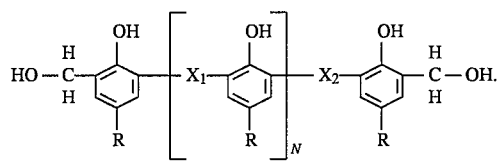

where:

$X_1$ and $X_2$ are radicals —$CH_2$— or $CH_2$—O—$CH_2$;

R is an alkyl radical containing 4 to 16 carbon atoms;

N is nought or a whole number between 1 and 6.

These compositions are prepared by condensation of alkylphenols with formaldehyde, according to known techniques.

By the term "sodium bisulphite" the sodium salt of sulphurous acid is meant. This composition is also called "acid sodium sulphite" and corresponds to the following general formula: $NaHSO_3$.

This composition is widely illustrated in the literature and is mentioned as a reducing agent due to the easiness it oxidizes into suplhate.

The process to obtain the plastoelastomeric compositions of this invention comprises the intimate mixing in the molten state of an olefinic plastomer with an EPDM elastomer comprising ethylene, another alpha-olefinic monomer having a number of carbon atoms greater than 2 and a dienic monomer as illustrated above. Such intimate mixing is obtained by submitting to mastication the components that form the mix, at a suitable temperature and according to weight ratios from 10 to 90% of plastomer and from 90 to 10% of EPDM elastomer, the binary vulcanization system comprising an alkylphenol-formaldehydic resin in an amount between 2 and 20% by weight relative to the EPDM elastomer, and sodium bisulphite, in an amount between 50 and 150 in weight, relative to said alkylphenol-formaldehydic resin.

Mastication is carried on until the elastomer is vulcanized, which requires a variable time depending on work temperature, as previously illustrated, and with a vulcanization degree which may reach 95% by weight.

The elastomer, dynamically vulcanized in this way, is finely and homogeneously dispersed in the plastomer, in the form of very small particles of the order of microns. The smallness of particles will be directly proportional to the shear stress of the rotatory apparatus utilized.

The plastoelastomeric compositions of this invention may include additives that are usually utilized by rubber and plastic material industries, such as pigments, organic and inorganic dyes, plasticizers such as paraffin and naphthene oils, fatty acids, fatty acid salts, organic extenders, such as, for instance, channel or funnel process carbon black, inorganic extenders, such as, for instance, carbonates, silicates, kaolins, talc and clays, and also agents stabilizing against heat, oxidation, ageing, etc.

The compositions of this invention can be transformed into artifacts or bodies formed by injection and/or compression moulding, calandering, extrusion, blow-moulding or rotomoulding, according to known techniques.

The following examples are given for the purpose of better illustrating the invention and should not be construed as limiting same.

EXAMPLES 1–9

Example 1–9 stress the high physical-mechanical, elasticity and processeability properties of the plastoelastomeric compositions obtained according to this invention, by utilizing different commercial types of EPDM elastomer and of polypropylenic olefinic plastomer, with a different weight ratio between the two of them. An homogeneous mix of an elastomer of the type and in the quantity as specified on Table 1 and a polypropylene of the type and in the quantity as specified on Table 1 was prepared in a Banbury-type internal mixer. The operating parameter of the mixer were:

Temperature of the machine: 180° C.

Speed of rotors: 90 revolutions/minute

Nominal capacity of the machine: 22 liters

Filling coefficient: 1.15

Mixing time: 2 minutes

Mass temperature: 190° C.

The binary vulcanization system and stearic acid were then added to the moving mass, in the quantities specified on Table 1. After 2 minutes and 30 seconds, an 8% increase in mass temperature and a 7% increase in electric energy consumption, detected by the connected amperometer, were observed: these changes point out to the vulcanization being completed. The unloaded and cooled mass was then moulded in a Triulzi-type 300 g injection mould for plastic materials, and then characterized.

For the determination of the characteristics of the compositions obtained from both these and the subsequent examples, the following analysis methods were followed:

Shore A and Shore D hardness: ASTM D2240

Ultimate tensile stress: ASTM D412

100% elongation modulus: ASTM D412

200% elongation modulus: ASTM D412

Ultimate elongation: ASTM D412

Tearing resistance: ASTM D624

100% elongation tension: ASTM D412

25% deflection: ASTM D395/B.

Processeability was determined by measuring head pressure with extrusion tests in laboratory drawplate, the operating features being as follows:

Temperature of die chaser: 195° C.

Temperature of machine body: 180° C.

Diameter of die chaser: 3 mm

Length/diameter ratio (L/D): 28

Diameter of screw (D): 20 mm

Delivery: variable, depending on processeability degree

Head pressure: variable, depending on processeability degree

The percent of vulcanized EPDM was determined by solubility in xylol on boiling: quantities are always referred to 100 parts in weight of pure elastomer, without taking into account the extension oil possibly included in the base polymer.

Table 1 shows the compositions expressed in weight parts and the characteristics of same.

TABLE 1

| EXAMPLES | 1 | 2 | 3 | 4 | 5 | 6 | 7 | 8 | 9 |
|---|---|---|---|---|---|---|---|---|---|
| EPDM (°) | 130 | 130 | 130 | | | | | | |
| EPDM (°°) | | | | 125 | 125 | 125 | | | |
| EPDM (°°°) | | | | | | | 200 | 200 | 200 |
| Polypropylene (i) | 40 | 45 | 65 | | | | | | |
| Polypropylene (ii) | | | | 40 | 50 | 65 | | | |
| Polypropylene (iii) | | | | | | | 40 | 50 | 65 |
| Paraffinic oil | 150 | 90 | 70 | 160 | 85 | 85 | 70 | 10 | 10 |
| Stearic acid | 2 | 2 | 2 | 2 | 2 | 2 | 2 | 2 | 2 |
| Sodium bisulphite | 6 | 6 | 6 | 9 | 9 | 9 | 9,5 | 9,5 | 9,5 |
| Alkylphenol-formaldehydic resin | 8 | 8 | 8 | 10 | 10 | 10 | 11 | 11 | 11 |
| Characteristics of the compositions | | | | | | | | | |
| Shore A hardness points | 55 | 65 | 75 | 60 | 70 | 75 | 60 | 70 | 75 |
| U.T.S. kg/cm$^2$ | 60 | 70 | 85 | 70 | 85 | 90 | 65 | 75 | 85 |
| 100% modulus kg/cm$^2$ | 15 | 20 | 31 | 18 | 20 | 32 | 20 | 25 | 30 |
| 200% modulus kg/cm$^2$ | 25 | 32 | 41 | 38 | 45 | 48 | 35 | 40 | 45 |
| % ultimate elongat. | 600 | 620 | 650 | 630 | 650 | 680 | 610 | 630 | 650 |
| Tearing resistance kg/cm | 25 | 28 | 30 | 25 | 29 | 35 | 27 | 30 | 36 |
| 100% tension, % | 10 | 12 | 13 | 11 | 12 | 13 | 10 | 11 | 13 |
| 25% deflection (72 h, 70° C.), % | 31 | 33 | 35 | 32 | 33 | 36 | 31 | 32 | 34 |
| Die drawing tests | | | | | | | | | |
| Delivery g/min | 50 | 45 | 48 | 45 | 50 | 55 | 50 | 52 | 58 |
| Head pressure kg/cm$^2$ | 250 | 240 | 190 | 220 | 190 | 170 | 190 | 170 | 165 |
| Vulcanized EPDM % weight | 93 | 94 | 93 | 94 | 94 | 94 | 95 | 95 | 95 |

DESCRIPTION OF INGREDIENTS UTILIZED

EPDM (°): Vistalon 6630, produced and marketed by EXXON Chem., having the following composition: propylene=30% in weight, ethylidine-norbornene non saturated monomer=8% in weight; paraffinic oil=23% in weight; Mooney viscosity, ML 1+4 at 121° C.= 40.

EPDM (°°): Dutral TER 235/E2, produced and marketed by Montedison S.p.A., having the following composition: propylene=32% in weight; ethylidine-norbonene non saturated monomer=7,5% in weight; paraffinic oil=20% in weight; Mooney viscosity, ML 1+4 at 121° C.=40.

EPDM (°°°): Keltan 509×100, produced and marketed by D S M - Holland, having the following composition: propylene=27% in weight; ethylidine-norbonene non saturated monomer=7% in weight; Mooney viscosity, ML 1+4 at 121° C.=50.

Polypropylene (i): Moplen D 50 S, produced and marketed by Himont S.p.A., having a flowability degree at 230° C. with a weight of 21,6 Newton=0,3 g/10 min.

Polypropylene (ii): Laqtene P.3020 GN3, produced and sold by ATO Chemie (France), having a flowability degree at 230° C. with a weight of 21,6 Newton=1,8 g/10 min and ethylene contents=3,5% in weight and propylene contents=96,5% in weight.

Polypropylene (iii): Novolen 1300 E, produced and sold by BASF (Germany), having a flowability degree at 230° C. with a weight of 21,6 Newton=0,4 g/10 min.

Paraffinic oil: Primol 352, produced and sold by EXXON Chem.

Alkylphenol-formaldehydic resin: SP 1045, produced and sold by Schenectady Chemicals, Inc., Midland (US).

EXAMPLES 10–13

The following examples stress the better processeability as well as the better elastic properties of the plastoelatomeric compositions of this invention (example 10), compared to those (example 11–13) obtained with other known vulcanizing systems.

The compositions shown on Table 2 were fed, in the quantities given in such Table, to a compounder/extruder of the Baker-Perkins type, with diameter=50 mm, Length/Diameter (L/D) ratio= 25, equipped with gravimetric hatcher for solids and a piston batcher for the plasticizing oil. An one-screw side extruder permits, by head-cutting in water, to give the compositions the physical form of pellets. The EPDM elastomer had been previously broken into small irregular particles by means of a cutter, in order to render it feedable by means of a weight-batcher.

Operating temperatures:

Zone B: 190° C.; Zone C: 190° C.; Zone D=200° C.; Zone E=205° C.; Zone F=210° C.; Zone G=220° C.; Zone H=225° C.; Zone J=228° C.; Zone K=230° C.

Die chaser of the one-screw side extruder=200° C.; optimal number of revolutions=230/min; recorded head pressure=80 bar; delivery per hour=65 kg.

The EPDM elastomer was introduced by means of weight-batcher nr. 1, the polypropylene plastomer by means of hatcher nr. 2, and the other ingredients—dry-premixed by special turbomixer—by means of batcher nr. 3 (batcher for small weight quantities). The plasticizing oil was introduced into the coumpounder-extruder by means of piston-batcher preheated at 120° C.

The analyses of the compositions obtained were carried out according to the same method utilized for the preceding examples. EPDM rubber is the Vistalon 6630 indicated by (°) in example 1, polypropylene is the Moplen D 50 S indicated by (i) in the preceding example, and the alkylphenol-formaldehydic resin is the S P type produced and sold by company Schenectady.

Table 2 shows the compositions expressed in weight parts and the main characteristics of same. The composition of example 12 shows clear signs of degradation of polypropylene.

TABLE 2

| EXAMPLES | 10 | 11* | 12* | 13* |
|---|---|---|---|---|
| EPDM (°) | 130 | 130 | 130 | 130 |
| Polypropylene (i) | 40 | 40 | 40 | 40 |
| Paraffinic oil | 110 | 110 | 110 | 110 |
| Stearic acid | 2 | 2 | 2 | 2 |
| Vulcanization system: | | | | |
| A | 20 | — | — | — |
| B | — | 22 | — | — |
| C | — | — | 9,8 | — |
| D | — | — | — | 20 |
| Characteristics of the compositions | | | | |
| Shore A hardness, points | 60 | 60 | 54 | 62 |
| U.T.S., kg/cm$^2$ | 75 | 61 | 48 | 58 |
| 100% modulus, kg/cm$^2$ | 18 | 13 | 9 | 12 |
| 200% modulus, kg/cm$^2$ | 32 | 28 | 12 | 25 |
| % ultimate elongation | 620 | 600 | 860 | 650 |
| Tearing resistance, kg/cm | 45 | 33 | 18 | 32 |
| 100% tension, % | 10 | 15 | 33 | 18 |
| 25% deflection (72 h at 70° C.), % | 28 | 32 | 45 | 36 |
| Extrusion tests: | | | | |
| Delivery, g/min | 45 | 28 | 40 | 30 |
| Head pressure, kg/cm$^2$ | 220 | 250 | 120 | 250 |
| Vulcanized EPDM, weight % | 95 | 98 | 99 | 99 |

| Description of the vulcanization systems | Parts in weight |
|---|---|
| A | |
| Alkylphenol-formaldehydic resin SP 1045 | 7 |
| Sodium bisulphite | 7 |
| Total | 14 |
| B | |
| Bromomethyl-alkylphenolic resin containing 6% in weight of halogen and carrying the trade mark SP 1055, produced and sold by company Schemectady Chemicals, Inc., Midland (US) | 6 |
| Active zinc oxide | 5 |
| Total | 11 |
| C | |
| Inert-carried dicumene peroxide with active agent = 40% in weight, carrying the trade mark Peroximon D C 40 and produced by company Montefluos (Italy) | 4,5 |
| Sulphur | 0,3 |
| Active zinc oxide | 5 |
| Total | 9,8 |
| D | |
| Alkylphenol-formaldehydic resin S P 1045 | 10 |
| Magnesium oxide | 8 |
| Total | 18 |

*Comparison examples

EXAMPLES 14–19

These examples stress the effectiveness and the synergism of the binary vulcanization system of this invention in the production of plastoelastomeric compositions having a dynamically vulcanized elastomeric phase, in terms of physical-mechanical and elasticity properties.

In these examples, the same operating methods were follwed as in examples 10–13.

Table 3 shows the compositions expressed in weight parts and the main characteristics of same, determined according to the standard methods described for example 1.

DESCRIPTION OF INGREDIENTS UTILIZED

EPDM: the one marked by (°°°) in examples 7–9, i.e. Keltan 509×100.

Polypropylene: the one marked by (i) in examples 1–3, i.e. Moplen D 50 S.

Polyethylene: Eraclene H ZB 6015; high density homopolymer produced by Enichem Polimeri (Italy), having density=0,960 g/cm; a flowability degree at 190° C. (with weight of 2,16 Newton)= 0,30 g/10 minutes.

Alkylphenol-formaldehydic resin: the same of examples 1–9. i.e. S P 1045.

Paraffinic oil: trade name Paraffinic Oil 0 B 10, produced by AGIP Petroli (Italy).

TABLE 3

| EXAMPLES | 14* | 15* | 16 | 17* | 18* | 19 |
|---|---|---|---|---|---|---|
| EPDM (°°°) | 200 | 200 | 200 | 200 | 200 | 200 |
| Polypropylene (i) | 40 | 40 | 40 | — | — | — |
| Polyethylene | — | — | — | 50 | 50 | 50 |
| Stearic acid | 2 | 2 | 2 | 2 | 2 | 2 |
| Paraffinic oil | 40 | 40 | 40 | 30 | 30 | 30 |
| Sodium bisulphite | — | — | 10 | — | — | 10 |
| SP 1045 resin | — | 10 | 10 | — | 10 | 10 |
| Characteristics of the compositions | | | | | | |
| Shore A hardness, points | 62 | 64 | 65 | 65 | 67 | 72 |
| U.T.S., kg/cm$^2$ | 35 | 50 | 75 | 30 | 44 | 80 |
| 100% modulus, kg/cm$^2$ | 9 | 11 | 26 | 7 | 12 | 33 |
| 200% modulus, kg/cm$^2$ | 20 | 27 | 38 | 18 | 23 | 42 |
| Ultimate elongation, % | 900 | 890 | 600 | 950 | 840 | 600 |
| Tearing resistance, kg/cm | 30 | 28 | 35 | 32 | 35 | 43 |
| 100% tension, % | 90 | 62 | 12 | 82 | 55 | 14 |
| 25% deflection (72 h at 70° C., % | 92 | 69 | 32 | 88 | 65 | 31 |
| Die drawing test: | | | | | | |
| Delivery, g/min | 100 | 80 | 40 | 120 | 100 | 75 |
| Head pressure, kg/cm$^2$ | 120 | 180 | 220 | 90 | 120 | 200 |
| Vulcanized EPDM, % weight | 0 | 45 | 95 | 0 | 55 | 94,6 |

*Comparison examples

We claim:

1. In a process for the preparation of a plastoelastomeric composition comprising an elastomeric phase of an elastomer of ethylene, another alpha-olefin having a greater number of carbon atoms, and a dienic monomer, and a plastomeric phase of a thermoplastic olefinic polymer, wherein the elastomeric phase is dynamically vulcanized by means of a vulcanizing agent, the improvement in that the vulcanizing agent is a binary system consisting of an alkylphenol-formaldehydic resin and sodium bisulphite NaHSO$_3$.

2. Process according to claim 1, wherein the alkylphenol-formaldehydic resin has the general formula

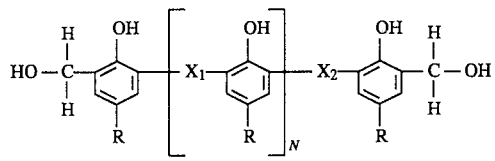

where:

X$_1$ and X$_2$ are radicals —CH$_2$— or —CH$_2$—O—CH$_2$—;

R is an alkyl radical containing 4 to 16 carbon atoms; and

N is nought or a whole number from 1 to 6.

3. Process according to claim 1 or 2, wherein not greater than 95% by weight of said elastomeric phase is vulcanized.

4. Process according to claim 1 or 2, wherein the elastomeric phase is from 10 to 90 parts and, correspondingly, the plastomeric phase is from 90 to 10 parts per 100 parts of said composition.

5. Process according to claim 1 or 2, wherein the alkylphenol-formaldehydic resin is used in an amount of from 2 to 20 parts in weight per 100 parts by weight of the elastomeric phase.

6. Process according to claim 1 or 2, wherein the alkylphenol-formaldehyde resin is used in an amount of from 3 to 15 parts by weight per 100 parts by weight of the elastomeric phase.

7. Process according to claim 1 or 2, wherein the sodium bisulphite is used in an amount of from 50 to 150 parts by weight per 100 parts by weight of alkylphenol-formaldehydic resin.

8. Process according to claim 1 or 2, wherein the sodium bisulphite is used in an amount of from 60 to 130 parts by weight per 100 parts by weight of alkylphenol-formaldehydic resin.

9. Process according to claim 1 or 2, wherein the dienic monomer of the elastomer is 1,4-hexadiene, 1,5-hexadiene, 1,5-cyclooctadiene, 2-methyl-1,4-pentadiene, dicyclopentadiene, ethylidine-norbornene or butadiene.

10. Process according to claim 9, wherein the elastomer has a molecular weight between 100,000 and 700,000, an ethylene content between 20 and 80% moles, a dienic monomer content of from 3 to 18% by weight, the rest being propylene.

11. Process according to claim 1 or 2, wherein the polyolefinic plastomeric phase consists of one or more homopolymers or copolymers of alpha-olefins.

12. Process according to claim 11, wherein the alpha-olefin is ethylene, propylene, butene-1, pentene-1, 1-methylpentene-1, 2-methylpentene-1, 3-methylpentene-1, 4-methylpentene-1, hexene-1, 1-methylhexene-1, 2-methylhexene-1, 3-methylhexene-1, 4-methylhexene-1, 5-methylhexene-1 or heptene-1.

13. Process according to claim 11, wherein the polyolefinic plastomeric phase is high-density polyethylene, low-density polyethylene, linear polyethylene, isotactic polypropylene, syndiotactic polypropylene or a propylene-ethylene copolymer.

14. Plastoelastomeric composition comprising an elastomeric phase of an elastomer of ethylene, another alpha olefin having a greater number of carbon atoms, and a dienic monomer, and a plastomeric phase of a thermoplastic olefinic polymers, wherein the elastomeric phase is dynamically vulcanized with a binary vulcanizing system consisting of an alkylphenol-formaldehydic resin and sodium bisulphite.

15. Artifacts obtained from the plastoelastomeric composition of claim 14, by injection and/or compression molding, calendering, extrusion, blow-molding, or rotomolding.

* * * * *